Sept. 29, 1964    H. J. KOZICKI ETAL    3,150,868
VEHICLE WHEEL SUSPENSION
Filed Dec. 1, 1961
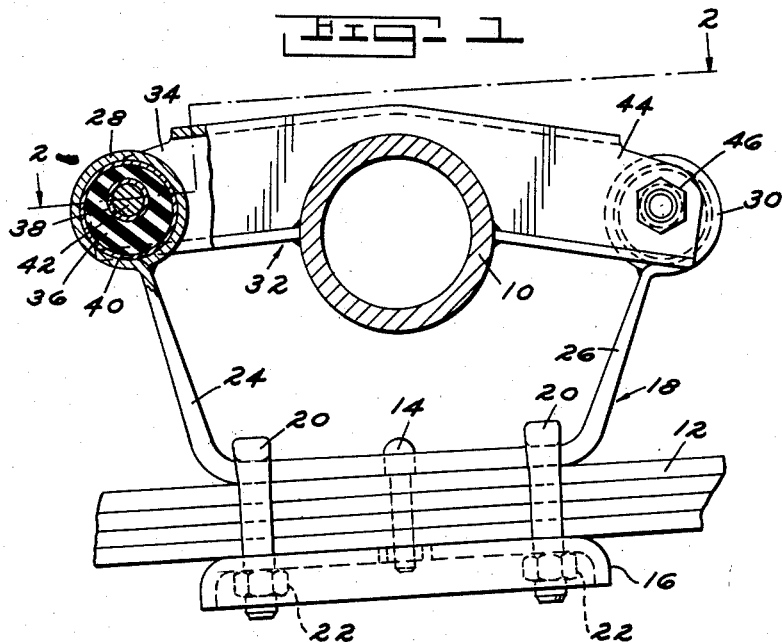
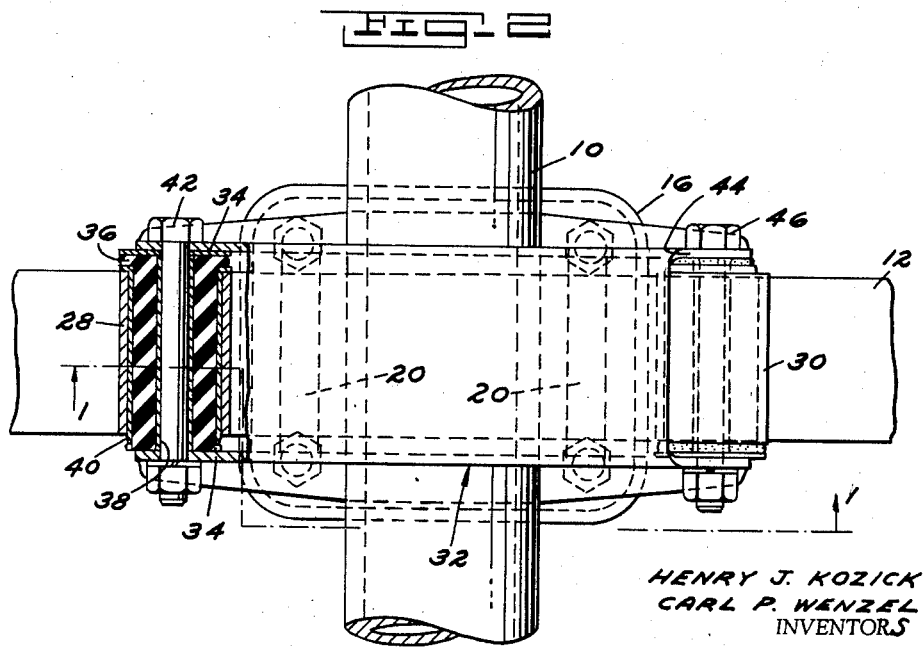
HENRY J. KOZICKI
CARL P. WENZEL
INVENTORS
BY John R. Faulkner
Clifford L. Sadler
ATTORNEYS United States Patent Office 3,150,868
Patented Sept. 29, 1964

3,150,868
VEHICLE WHEEL SUSPENSION
Henry J. Kozicki, Orchard Lake, and Carl P. Wenzel, Garden City, Mich., assignors to Ford Motor Company, Dearborn, Mich., a corporation of Delaware
Filed Dec. 1, 1961, Ser. No. 156,411
1 Claim. (Cl. 267—52)

The present invention relates to vehicle suspensions and more particularly to means for connecting an axle housing to a leaf spring, a trailing arm or a similar suspension positioning device.

The conventional vehicle suspension system provides resilient means for interconnecting a vehicle body and the unsprung road wheel. When the wheels strike an obstacle in the road, it will traverse a jounce or rebound vertical path as dictated by the nature of the obstacle.

It has been determined that in addition to producing vertical forces that are accommodated by the conventional suspension, a horizontal force component will be exerted upon the wheel by reason of its encounter with an obstruction. The conventional suspension resiliently supports the body for only vertical wheel movement and therefore, the horizontal force component is, for the most part, transmitted directly to the passenger compartment as a shock force.

In view of the foregoing state of the art, it is the principal object of this invention to provide a vehicle suspension that will permit horizontal wheel recession or wheel compliance to resiliently absorb the horizontal forces.

More specifically, the present invention provides an embodiment in which the axle housing is connected to a longitudinal leaf spring, or other device such as a trailing arm that controls its vertical path, by means to permit the housing's longitudinal displacement. In the preferred embodiment, the axle housing is spaced vertically above a leaf spring and a spring metal attaching piece is interposed therebetween. The attaching member has a pair of upstanding leg portions that are flexible and are adapted to permit the wheel and axle housing to move rearwardly upon impact with a road obstacle.

This construction reduces the transmitttal of shocks to the passenger compartment and eliminates what is known as ride harshness. It is particularly effective against minor bumps such as tar strip expansion joints used in concrete pavement.

The objects and advantages in this invention will become readily apparent from the following discussion and the accompanying drawings, in which:

FIGURE 1 is a side elevational view of an axle housing to leaf spring connection; and, FIGURE 2 is a sectional view taken along section lines 2—2 of FIGURE 1.

Referring now to the drawings wherein the presently preferred embodiment of this invention is disclosed, FIGURE 1 shows an axle housing 10 that is spaced vertically above a laminated leaf spring 12. A vertically situated bolt 14 passes through the leaves of the spring 12 and maintains their alignment. A spring clamp 16 is situated beneath the leaf spring 12. A generally U-shaped spring member 18 is located above the spring 12 and has its body portion secured thereto by means of a pair of U-bolts 20. The legs of the U-bolts 20 extend downwardly about the sides of spring 12 and are secured to the lower clamp 16 by nuts 22.

The spring element 18 is formed of flat leaf spring stock and has a pair of tapered leg portions 24 and 26 that extend upwardly in an inclined fashion. The ends of the legs 24, 26 are curled over to form fore and aft bushing eyes 28, 30.

An attaching bracket 32 is welded to the axle housing 10 and extends generally in a longitudinal direction. Its forward end 34 is secured to the eye 28 by means of a rubber bushing.

The construction of the forward bushing at eye 28 is disclosed in FIGURE 2. A cylindrical rubber element 36 is situated within the eye 28 and carries inner and outer metallic sleeves 38 and 40. A bolt 42 passes through the ends 34 of the axle housing bracket 32 to secure it to the bushing assembly. The bushing assembly is of nearly conventional construction except that the bolt 42 is not concentric within the eye 28. Its center line is vertically displaced to provide a greater rubber layer beneath the bolt 42 than above it. This arrangement permits desired control and isolation of the different forces encountered during jounce and rebound movement.

The axle housing bracket 32 has a rearwardly extending portion 44 that is joined to the eye 30 of spring leg 26 by a bolt 46 passing through a rubber bushing that is similar in construction to the bushing at eye 28.

With the axle housing to leaf spring connection illustrated in the drawings, relative longitudinal movement is permissible between the axle housing 10 and leaf spring 12. If the road wheel journalled at the outer end of axle housing 10 should strike an obstacle, horizontal force components would be created. Such forces would tend to cause the axle housing 10 to move rearwardly relative to the spring 12 resulting in the flexing of spring legs 24 and 26. The legs 24 and 26 will absorb the forces and shocks resiliently and urge the axle housing 10 to return to its normal position when the forces are relieved.

The foregoing description constitutes the preferred embodiment of this invention. Other modifications are contemplated. While the description relates to leaf spring and axle housing constructions, the invention is also adaptable to other suspension constructions having means to position unsprung members. Such modifications come within the scope and spirit of the following claim.

I claim:

A suspension system for a vehicle comprising a transverse axle housing, a longitudinal leaf spring member and means interconnecting said housing and said leaf spring, said means including a generally U-shaped leaf spring member, said U-shaped leaf spring member having a pair of vertically extending leg portions each interconnecting said housing and said longitudinal leaf spring, said portions being resilient and adapted to permit relative movement between said housing and said longitudinal leaf spring in a direction generally parallel to the longitudinal axis of said longitudinal leaf spring.

References Cited in the file of this patent

UNITED STATES PATENTS

| 1,537,994 | McGeorge | May 19, 1925 |
| 1,720,432 | Pampinella | July 9, 1929 |
| 1,747,780 | Lemaigre | Feb. 18, 1930 |
| 2,309,812 | Utz | Feb. 2, 1943 |
| 2,578,702 | Hellwig | Dec. 18, 1951 |
| 2,942,870 | Balding | June 28, 1960 |

FOREIGN PATENTS

| 339,040 | Germany | July 12, 1921 |
| 383,254 | France | Mar. 2, 1908 |